350-167.

06-15-71  XR  3,584,950  SR

United States Patent

[11] 3,584,950

[72] Inventor Robert W. Gundlach
Victor, N.Y.
[21] Appl. No. 683,837
[22] Filed Nov. 17, 1967
[45] Patented June 15, 1971
[73] Assignee Xerox Corporation
Rochester, N.Y.
Continuation of application Ser. No. 569,312, Aug. 1, 1966, now abandoned.

[54] LENS STRIP OPTICAL SCANNING SYSTEM
10 Claims, 6 Drawing Figs.
[52] U.S. Cl.................................................... 355/50,
95/53, 350/167, 353/30
[51] Int. Cl....................................................G03b 27/50
[50] Field of Search.......................................... 88/24;
95/73, 75, 53; 355/50, 1, 51; 350/167; 353/30

[56] References Cited
UNITED STATES PATENTS
3,241,438    3/1966    Frank............................ 88/24
FOREIGN PATENTS
676,947    6/1939    Germany.....................

Primary Examiner—Samuel S. Matthews
Assistant Examiner—Richard A. Wintercorn
Attorneys—Norman E. Schrader, James J. Ralabate and Ronald Zibelli ABSTRACT: An optical system having a plurality of optical imaging devices each comprising a plurality of refracting lens elements to receive light rays from an object and project them toward an image plane forming a continuous image of the object thereon. The imaging devices can scan portions of the object to project them toward the image surface forming a continuous image of the scanned object thereon.

INVENTOR.
ROBERT W. GUNDLACH

INVENTOR.
ROBERT W. GUNDLACH

INVENTOR.
ROBERT W. GUNDLACH
BY
ATTORNEYS

LENS STRIP OPTICAL SCANNING SYSTEM

This application is a continuation of my copending application Ser. No. 569,312, filed Aug. 1, 1966, now abandoned.

The present invention relates to an optical imaging device, and more particularly to an optical scanning system of very short focal length that is useful for transmitting images of an original document to be copied onto a photosensitive surface on which a wrong reading, upright light image of the information on the document is formed.

In recent years there has been a tremendous upsurge and growth in the area of office copying machines. In particular, the type of office copying machine which has made the greatest impact as for number of machines in operation and the use thereof has been those based upon the electrostatic theory. Generally, the "electrostatic" copier has been of two forms with respect to the use of photosensitive surface upon which latent electrostatic images are produced. One form utilizes copy paper which has been previously treated with photosensitive chemicals and is directly charged, exposed, developed and fixed to produce a copy of an original.

The other form of most generally used "electrostatic" copier is one which utilizes a reusable photosensitive surface, that is, a copier which employs a photosensitive plate such as a drum that is directly charged, exposed and developed repeatedly as is customary in the devices. In this form of a copier, copies of the original are produced on ordinary paper during a transfer step which causes the transfer of a developed powder image from the photosensitive plate to the copy paper.

Both forms of these machines, however, generally employ an optical system for directing image light rays from an original to-be-copied to the photosensitive surface during the exposure step in a copying cycle. The image light rays themselves are produced by scanning an original to be copied with an illumination system that moves across the original for illuminating the entire original during a copying cycle. In these copying machines, the conjugate of the optical system is relatively large and therefore requires a relatively large space even with the use of mirrors for folding the system's optical path. For example, for a one to one magnification some copying machines require a total conjugate as high as 36 inches or more.

Along with the tremendous growth in copying machines there also has been the need for a compact copier of the reflex-dry type which will occupy a small area on an ordinary office desk. Such a copying machine would require an optical system having a relatively short optical conjugate and also, for compactness, an arrangement of a photosensitive surface with the original to be copied which will occupy as small a space as possible.

There are many optical devices which require relatively short conjugates so that light images may be transmitted from an original document to a photosensitive surface, wherein both are located very close to each other and with the optical system therebetween. Generally, these devices employ optical imaging systems based upon laminar optics, fiber optics or segmented or cross-cylinder which may be arranged to permit close positioning of an original document relative to a photosensitive surface. However, except for fiber optics, in utilizing optical systems of these types in copying machines which produce copy on presensitized copy paper wherein no additional image transfer step is required, the photosensitive surface and the original must be moved relative to the optical system and in the opposite direction relative to each other, thereby necessitating a relatively large area for containing mechanisms which will permit this action.

With the photosensitive surface also being the copy paper, machines utilizing these optical devices generally utilize a paper web moving mechanism which is arranged to move paper web across the optical system at some synchronized rate. For a small compact copier, this would require a mechanism for moving the document in one direction and means for moving the photosensitive surface in the other, the combined length of which would be at least as great as the total length of the two sheets if flat surfaces are used, or a greater than necessary height will be necessary if the original and the photosensitive surface are arranged around support drums.

In utilizing optical systems having short conjugates in copying machines of the "reusable-type," wherein an image transfer step is necessary in the copying process, the optical system must be capable of effecting upright and wrong reading images, which when used to produce the final developed transferred copy results in the production of upright and wrong reading copy. The above-described optical systems, such as, directly oriented fiber optics, laminar optics, and cross-cylindrical optics in present use are incapable of producing such upright and wrong reading images upon a reusable photosensitive surface for permitting the transfer of an image therefrom to copy material. As for fiber optics, critically small spacing requirements between the entry faces of the fibers and a photoreceptor create problems of abrasion in the case of reusable photoreceptors such as xerographic plates or drums. Another limitation of these systems is that resolution is limited by the fiber diameters or laminar period, etc., in addition to spacing between the optical device and the photoreceptor.

Therefore it is a principle of the present invention to improve optical scanning systems by utilizing optical imaging devices which are adapted to present upright, wrong reading images upon an image plane.

It is another object of the invention to improve optical scanning systems by utilizing imaging devices having extremely short focal length, resulting in very short lens-object and lens-image distances, great compactness and high optical efficiency.

It is another object of the invention to utilize an optical system suitable for reflex copying which will permit maintaining an object plane and an image plane fixed relative to one another during scanning by the optical system.

These and other objects and advantages will become apparent to those skilled in the art after reading the following description taken invention; conjunction with the accompanying drawings wherein.

Figure 1:
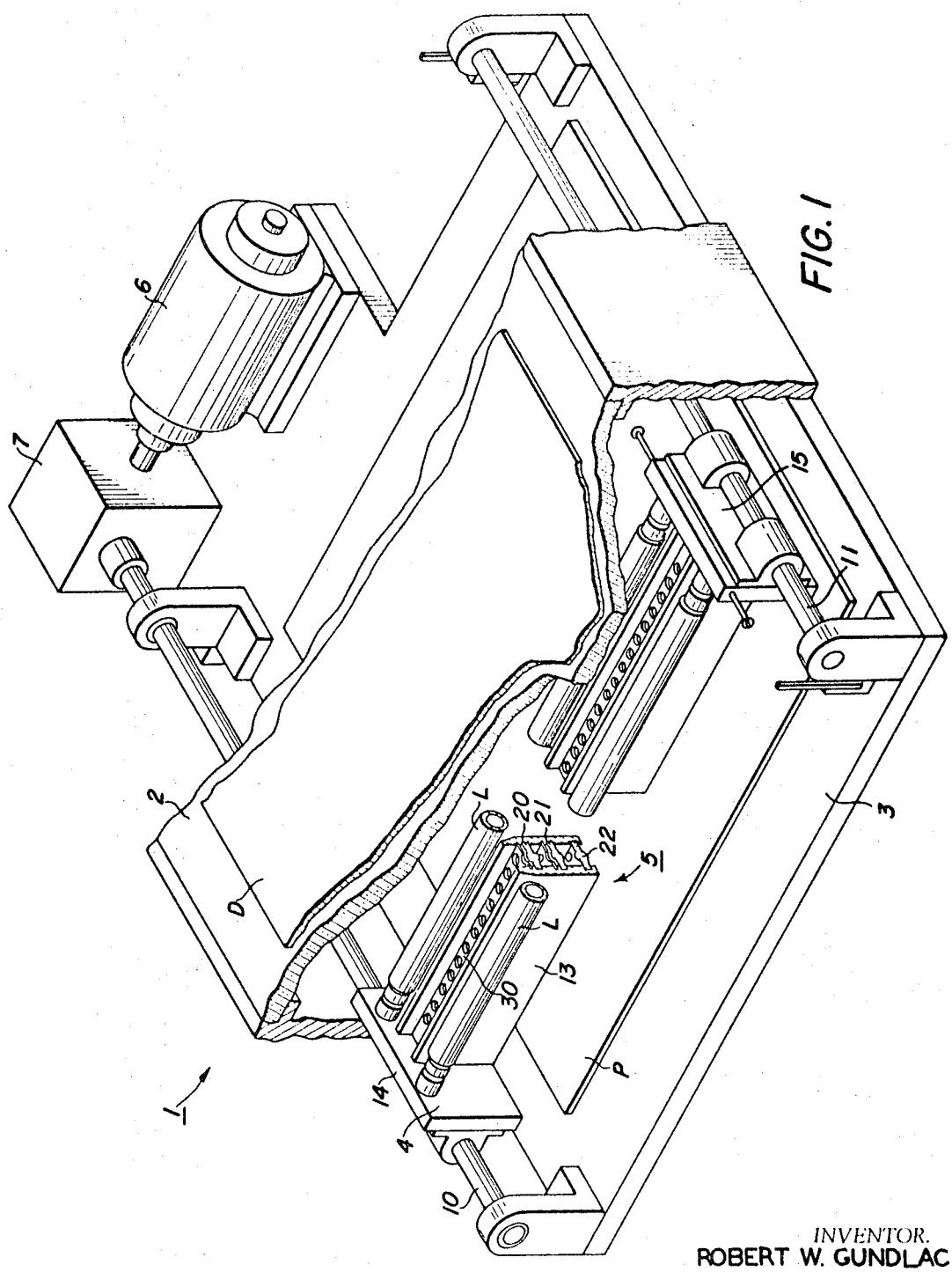
FIG. 1 is a schematic isometric view showing the basic configuration of a copying machine embodying the principles of the present invention.

Referring in more detail to the drawings, and in particular, to FIG. 1, there is shown a copy machine which may be utilized in accomplishing the objects of the present invention. The machine, generally indicated by the reference numeral 1, comprises a transparent platen 2 for supporting face down an original document D to be copied, a fixed support plate 3 for a photosensitive plate P having a layer of photosensitive material face up, a movable carriage 4 which supports an optical imaging system generally indicated by reference number 5 and a drive system including a reversible constant speed motor 6 and a gear box 7 for driving the carriage 4 across the opposing faces of the document and the photosensitive surface P.

The carriage 4 is mounted upon a drive screw 10 and a bearing rod 11 arranged with their axes in parallel and spaced on either end of the support plate 3. The gearbox 7 is connected to the drive screw 10 and adapted to rotate the same for driving the scanning system 5 in either direction. The drive system should be adapted to produce movement of the optical imaging system 5 in either direction with a constant movement that is adapted to be reversed when the system is at either end of its travel.

The system 5 comprises an elongated housing 13 supported at one end by a block 14 which threadedly receives the screw 10 and at its other end by a block 15 slidably receiving the rod 11, the blocks 14 and 15 being part of the carriage 4 to be movable therewith. Also mounted upon and between blocks 14 and 15 are a pair of fluorescent lamps L mounted in suitable sockets and energized from a suitable electric power source (not shown). The lamps are physically arranged to be in parallel and spaced on either side of the housing 13 adjacent the side of the document D that is to be copied in order to illuminate the document to produce light rays thereof.

Figure 2:
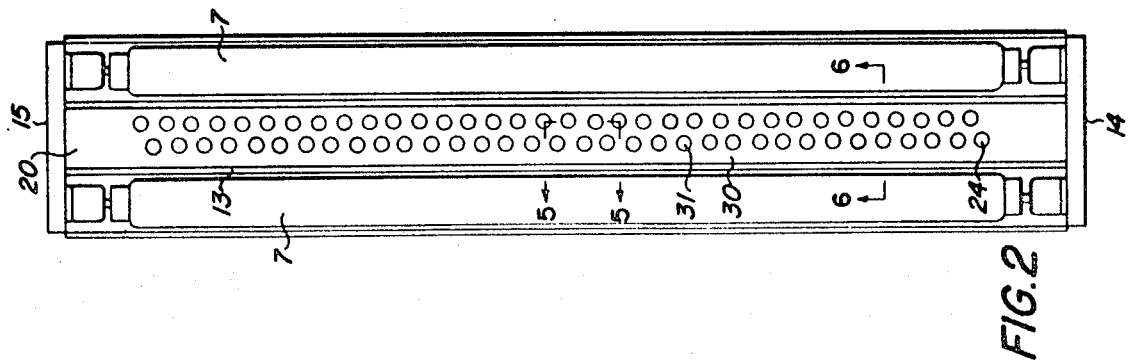
FIG. 2 is a plan view of the scanning system utilized in the machine of FIG. 1.
Figure 5:
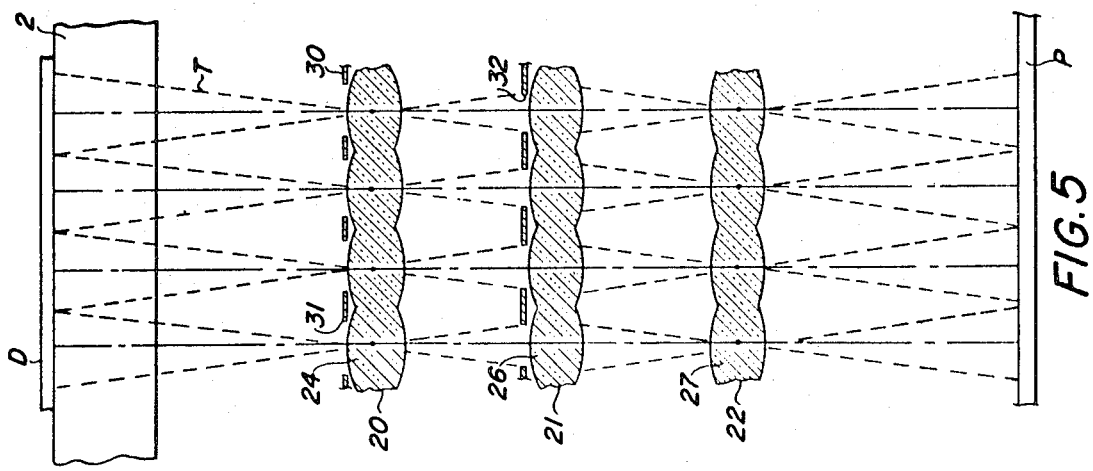
FIG. 5 is a sectional view taken along the line 5-5 in FIG. 2 showing a few imaging devices and the optical ray traces for various points upon an original to be copied.

Within the housing 13 there are mounted three elongated lens strips 20, 21 and 22 arranged along the length of the housing and in superimposed relationship relative to each other, between the document D and photosensitive surface P. The uppermost lens strip 20 as viewed in FIGS. 1 and 5, is formed with a plurality of lens elements 24 which run along the entire length of the strip. As shown in FIG. 2, the strip 20 is formed with two parallel rows of lens elements 24 and in such a way that the second row is shifted a distance equal to one-half of the distance between any two of the lens elements in a row. Preferably, the lens strip 20 is made of molded plastic wherein the lens elements 24 are integral with the material forming the other portions of the strip.

Figure 3:
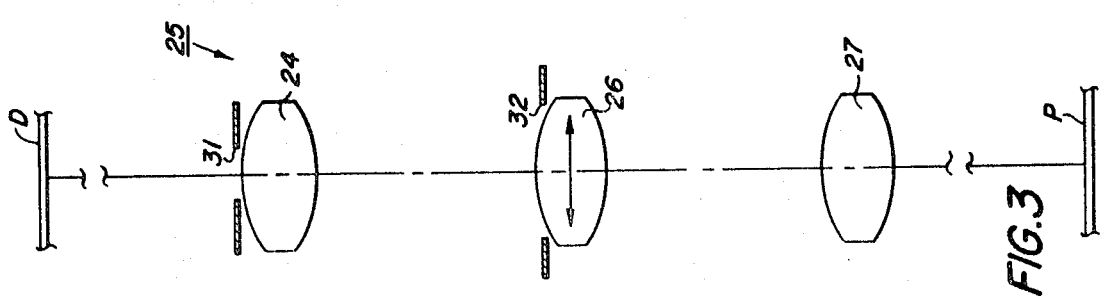
FIG. 3 is a schematic view of one of the imaging devices in the scanning system.

The lens strips 21 and 22 are exactly the same as the strip 20 and are arranged relative thereto in such a manner that a lens element of each of the strips is coaxial with the lens element of the other strips to form a single imaging device. A single imaging device, generally indicated by the reference numeral 25, is shown in FIG. 3 with the lens element 24, which is a part of the lens strip 20, coaxial with a lens element 26 of the lens strip 21 and a lens element 27 which is part of the lens strip 22. The optical imaging device 25 in FIG. 3 comprising identical lens 24, 26 and 27 and in conjunction with the stop 31 and the field stop 32, represents one of the many that are present in the imaging system 5 as a result of the proper location of the lens strips 20, 21 and 22 relative to one another. As is well known in the art, lenses having surfaces with curvature in more than one direction, as shown, are capable of imaging light rays parallel to their axes to the same point in more than one meridian. Each of the imaging devices, as shown in FIG. 3, is adapted to scan an elemental or discrete area of the document D which is in the focal plane of the lens element 24 and to project an image of the elemental area upon the photosensitive surface P, which is in the focal point of the lens element 27. It will be apparent then with the plurality of imaging devices that comprise the imaging system 5 that the entire document to be copied D may be scanned with one complete movement of the system 5 from one end thereof to the other.

Figure 4:
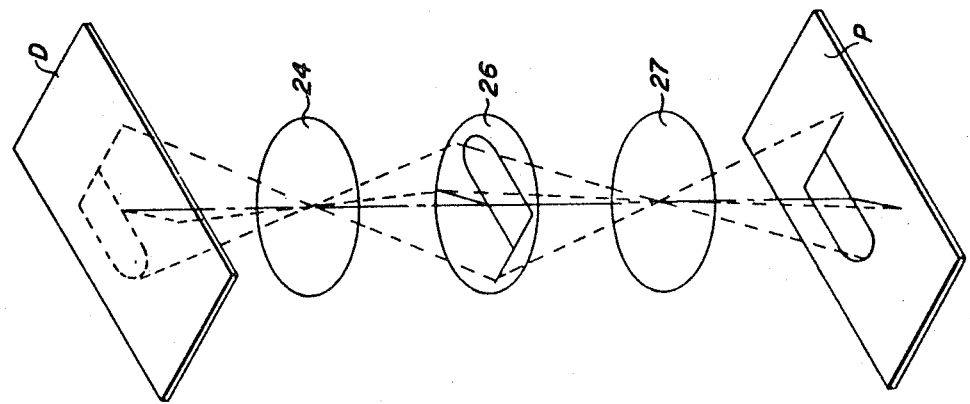
FIG. 4 is a schematic isometric view of an imaging device showing typical ray traces for an elemental area being scanned.
Figure 6:
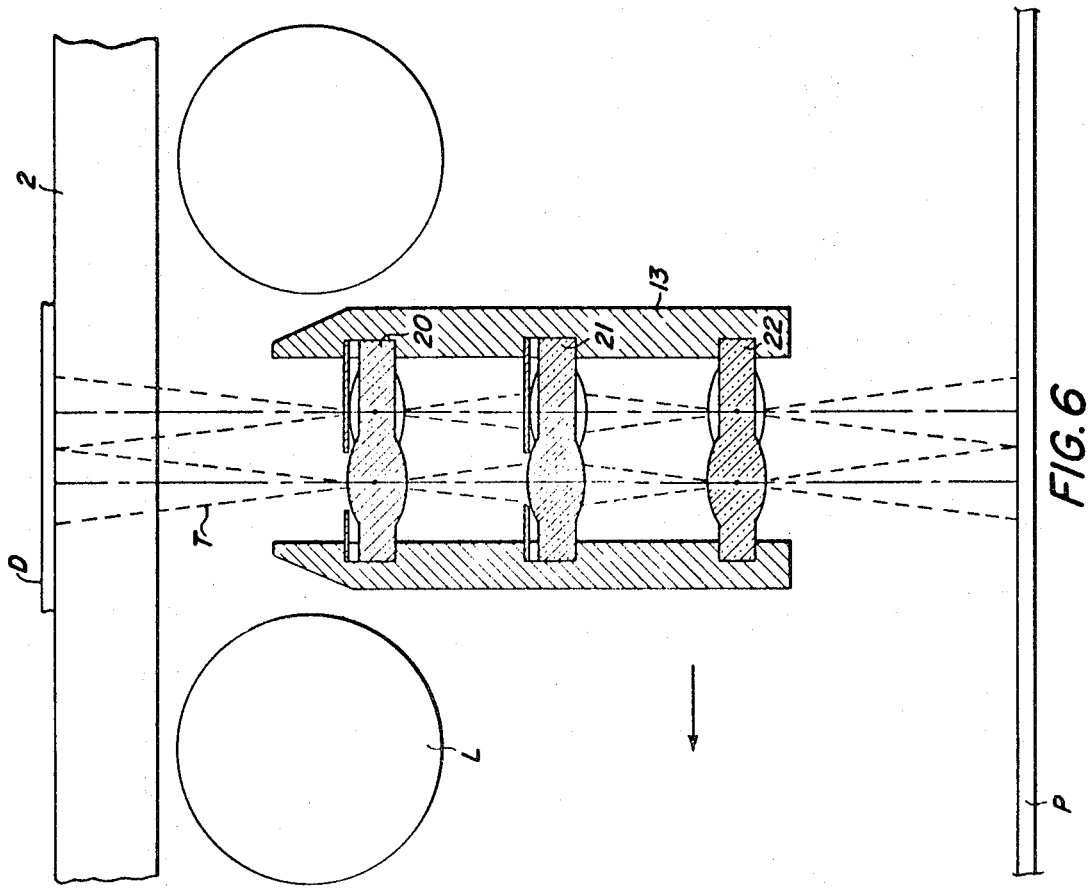
FIG. 6 is a sectional view taken along the line 6-6 in FIG. 2 showing an imaging device and ray traces therethrough.

The imaging system 5, in order to assure complete scanning coverage by all of the devices 25, includes an apertured plate 30 having plurality of apertures 31 each of which is positioned upon a corresponding lens element 24 of the strip 20. In FIG. 3 each of the apertures 31 serve as an aperture stop for a corresponding lens element 24 for controlling the amount of light entering each of the devices 25. The field stop 32 serves to control the object area coverage and thereby limit the size of an elemental area being scanned at any one time by any of the imaging devices 25. In each of the imaging devices the lens element 24 serves as the objective lens for the imaging device and is adapted to focus the elemental area of the document upon a field lens 26, as shown in FIG. 4. In FIG. 4, 5 and 6, by way of example, the letter R is illustrated with the ray traces T, as being imaged at the focal plane of the lens 24 which is coincident with the plane of the lens 25. It will also be noted that the letter R is inverted and reverted.

The lens 27, in turn, images the image of the letter R at the field lens 26 upon the photosensitive surface P and, it will be noted by the example in FIG. 4, the letter R is now upright and wrong reading relative to the original letter on the document D. Each of the imaging devices 25 in the system 5 then are adapted to reproduce elemental areas of an object plane, such as the document D, and form corresponding images upon an image plane which are upright and wrong reading. The composite of the elemental images so produced will represent the complete pictorial representation of the information on the document D. In the event that the image plane P is in the form of a reusable, electrostatic copying plate such as a xerographic selenium photoconductor plate or drum, the latent image on the plate or drum will be upright and wrong reading so that the powdered developed image will transfer to a sheet of paper as right reading.

It will also be appreciated that the image plane P, which is the particular structural environment for the present invention has been designated a photosensitive surface, may also be diffusion material so as to permit the production of copy by the diffusion transfer process. In this event, the upright, wrong reading image presented on the top surface of the plate P will result in a right reading rendition on the bottom surface or that surface which would be face up to the reader.

From the foregoing, it will be apparent that the arrangement of a multiplicity of imaging devices, each comprising three superimposed lens elements, produces results in the imaging function, such as during copying, in a manner which cannot be duplicated or equated by the sue of fiber optics, laminar optics, etc. The use of the three lens, multiple-lens array of the present invention, is that it may be utilized between relatively stationary conjugate planes. If the lens array in the imaging system 5 were held fixed and the two conjugate planes moved relative thereto in the same direction, the result would be the same. If on the other hand, the linear lens array were fixed and the two planes were scanned while moving in opposite directions, the imaging integration would be destroyed and no useful image would be produced. The only exception to this project is the case where a single line of resolution elements, as distinguished from the much larger elemental areas, is scanned. This is approximately analogous to the case of the single-row fiber block, since the multirow fiber block will not image in a counter-scan relationship.

The lens elements 24, 26 and 27 should be large compared to the image elements to be resolved or, in other words, the resolution elements. Many of these image elements should be reproduced at any given moment in the field of the imaging device 25. On the other hand, fiber optic scanners and laminar optic scanners, etc., can only scan one line of resolution element at a time and therefore are very restricted in aperture. The sizes of the lens 24, 26 and 27 may be determined by the copying machine compactness, working distance and convenience. Generally this size would be many times greater than a resolution element and many times smaller than the document area.

While the invention has been described with reference to the structure disclosed herein it is not confined to the details set forth and, this application is intended to cover such modifications or changes as may come within the purposes of the improvements or the scope of the following claims.

What I claim is:

1. An optical imaging system for projecting light images from an object toward an image surface, said object and said image surface being in optically opposed relationship for at least parts thereof with the optical distance between the parts substantially fixed, said imaging system including a plurality of optical imaging devices arranged to receive light rays from the object and to project them toward the image surface, each of said optical imaging devices comprising a plurality of refractive lens elements arranged along a common optical path extending between the object and the image surface so that imaging may occur between the lens element nearer the object and the lens element nearer the image surface, each of said optical imaging devices including at least one element having a surface capable of imaging in more than one meridian, 2. An optical imaging system for projecting light images from an object plane to an image plane, said planes being tin face to face relationship optically for at least portions thereof and fixed optically relative to each other, said imaging system including
   a plurality of optical imaging devices arranged between said planes, each of said optical imaging devices comprising a plurality of refractive lens elements arranged along a common optical axis extending between the object plane and the image plane, and wherein the object plane is in the focal plane of a first of said lens elements and the image plane is in the focal plane of the lens element adjacent thereto.
   each of said imaging devices being arranged to scan a discrete portion of the object plane and to project an upright, wrong reading image thereof upon the respective discrete portion of the image plane,
   drive means for producing relative movement between the imaging system and the object and image planes and arranged to maintain the distance between the imaging system and one of said planes relatively constant during said movement whereby the entire object plane is projected onto the image plane in upright, wrong reading relation,
   and means to support the object plane and image plane immovably relative to each other during the relative movement.

3. The optical imaging system in claim 2 wherein a first of said lens elements is adapted to image said discrete portion located at the object plane upon another of said lens elements and a third of said lens elements is adapted to image the effect on said another lens element upon the image plane.

4. The optical imaging system in claim 2 wherein each of the lens elements have approximately the same optical lens characteristics.

5. The optical imaging system of claim 2 wherein each of said optical imaging devices comprises three refractive lens elements and the object plane is in the focal plane of the first of said lens elements and the image plane is in the focal plane of the third of said lens elements.

6. A copying machine including
   means for supporting an original to be copied and a photosensitive surface in face-to-face relationship optically for at least portions thereof and to maintain one immovable optically relative to the other,
   a plurality of optical imaging devices arranged between the original and said surface, each optical imaging device comprising a plurality of refractive lens elements arranged along a common optical axis extending between the object plane and the image plane,
   each of said imaging devices being arranged to scan a discrete portion of the original and to project an upright, wrong reading image thereof upon the corresponding discrete portion of the photosensitive surface,
   and drive means for producing relative movement between said imaging devices and the original and photosensitive surface while the original and photosensitive surface are maintained immovable optically relative to each other and arranged to maintain the distance between the devices and the original relatively constant during said movement whereby the entire original is projected onto the photosensitive surface in upright, wrong reading relation.

7. An optical imaging system for projecting light images from an object toward an image surface, said object and said image surface being in optically opposed relationship for at least parts thereof with the optical distance between the parts substantially fixed, said imaging system including
   a plurality of optical imaging devices arranged along corresponding optical paths extending between said object and said image surface, each of said optical imaging devices comprising a plurality of refractive lens means arranged along a common optical path extending between the object and the image surface with a lens means being located on each side of the midpoint of the optical path so that an intermediate image may be formed substantially at the midpoint of the optical path,
   each of said optical imaging devices including at least one lens means capable of imaging light rays parallel to its axis to the same point in more than one meridian,
   the optical imaging devices being disposed in laterally adjacent relation so as to receive light rays from contiguous portions of the object and to project them along their corresponding optical paths whereby a continuous image of the portions is projected toward the image surface.

8. An optical imaging system for projecting light images from an object toward an image surface, the object and image surface being in optically opposed relationship for at least parts thereof with the optical distance between the parts substantially fixed, said imaging system including
   a plurality of optical imaging devices arranged to receive light rays from the object and to project them toward the image surface in upright, wrong reading orientation with respect to the received orientation,
   each of said optical imaging devices comprising a plurality of refractive lens elements arranged along a common optical path extending between the object and the image surface,
   the optical imaging devices being positioned to receive light rays emanating from contiguous portions of the object and to project them toward the image surface whereby a continuous image of the portions is projected toward the image surface,
   means to cause relative movement between the imaging system and the object and image surface,
   and means to support the object and image surface optically immovable with respect to each other during the relative movement.

9. An optical imaging system for projecting light images from an object toward an image surface, the object and the image surface being in optically opposed relationship for at least parts thereof with the optical distance between the parts substantially fixed, said imaging system including
   a plurality of optical imaging devices arranged along corresponding optical paths extending between the object and image surface, each of said optical imaging devices including at least two refractive optical means spaced from each other and arranged along a common optical path extending between the object and the image surface,
   the refractive optical means positioned closer to the object being adapted to invert and revert light rays and form an image in the space between the optical means,
   the refractive optical means positioned closer to the image surface being adapted to invert and revert light rays and project the image formed in the space between the optical means along the optical path toward the image surface,
   the optical imaging devices being disposed in laterally adjacent relation so as to receive light rays from contiguous portions of the object and to project them along their corresponding optical paths whereby a continuous image of the portions is projected toward the image surface.

10. The imaging system as set forth in claim 9 wherein the refractive optical means are lenses having spherical surfaces.